US009775285B2

(12) United States Patent
Blunier

(10) Patent No.: US 9,775,285 B2
(45) Date of Patent: *Oct. 3, 2017

(54) STORAGE TANK SUMP ARRANGEMENT FOR AN AGRICULTURAL IMPLEMENT

(71) Applicant: CNH Industrial America LLC, New Holland, PA (US)

(72) Inventor: Timothy R. Blunier, Danvers, IL (US)

(73) Assignee: CNH Industrial America LLC, New Holland, PA (US)

(*) Notice: Subject to any disclaimer, the term of this patent is extended or adjusted under 35 U.S.C. 154(b) by 46 days.

This patent is subject to a terminal disclaimer.

(21) Appl. No.: 14/883,719

(22) Filed: Oct. 15, 2015

(65) Prior Publication Data
US 2016/0029554 A1 Feb. 4, 2016

Related U.S. Application Data

(62) Division of application No. 13/604,702, filed on Sep. 6, 2012, now Pat. No. 9,173,342.

(51) Int. Cl.
*A01C 23/00* (2006.01)

(52) U.S. Cl.
CPC .................. *A01C 23/008* (2013.01)

(58) Field of Classification Search
CPC .............................. A01C 23/008; A01C 23/00
USPC ....... 111/170, 174, 175, 186, 188, 200, 900, 111/903, 904, 925
See application file for complete search history.

(56) References Cited

U.S. PATENT DOCUMENTS

| 3,310,237 | A | | 3/1967 | Welch |
| 3,386,660 | A | | 6/1968 | Marriam |
| 4,232,874 | A | | 11/1980 | Ystebo |
| 4,244,522 | A | | 1/1981 | Hartwig |
| 4,313,566 | A | | 2/1982 | Klein |
| 4,753,492 | A | | 6/1988 | Leiber et al. |
| 4,875,921 | A | | 10/1989 | Paau |
| 5,913,915 | A | * | 6/1999 | McQuinn ............. A01B 79/005 700/231 |
| 7,585,000 | B1 | | 9/2009 | Hoek |
| 7,694,638 | B1 | | 4/2010 | Riewerts et al. |
| 7,779,769 | B2 | | 8/2010 | Memory |
| 9,173,342 | B2 | * | 11/2015 | Blunier ................ A01C 23/008 |
| 2006/0086296 | A1 | * | 4/2006 | Wichmann ........... A01C 23/042 111/127 |

* cited by examiner

*Primary Examiner* — Christopher J Novosad
(74) *Attorney, Agent, or Firm* — Rebecca L. Henkel; Rickard K. DeMille

(57) ABSTRACT

A storage tank sump arrangement for an agricultural implement. One agricultural implement includes row units configured to deliver flowable agricultural product to a field. The agricultural implement also includes a storage tank configured to hold the flowable agricultural product. The storage tank includes a first sump and a second sump. Further, the first sump is positioned adjacent to a front portion of the storage tank relative to a direction of travel and the second sump is positioned adjacent to a rear portion of the storage tank relative to the direction of travel. The agricultural implement includes a pump in fluid communication with the first sump and the second sump. The pump is configured to pump the flowable agricultural product from the storage tank to the row units.

20 Claims, 4 Drawing Sheets

STORAGE TANK SUMP ARRANGEMENT FOR AN AGRICULTURAL IMPLEMENT

CROSS-REFERENCE TO RELATED APPLICATION

This application is a divisional of U.S. patent application Ser. No. 13/604,702, entitled "STORAGE TANK SUMP ARRANGEMENT FOR AN AGRICULTURAL IMPLEMENT", filed Sep. 6, 2012, which is herein incorporated by reference in its entirety.

BACKGROUND

The invention relates generally to ground working equipment, such as agricultural equipment, and more specifically, to a storage tank sump arrangement for an agricultural implement.

Generally, fertilizer application implements are towed behind a tractor or other work vehicle via a hitch assembly secured to a rigid frame of the implement. These fertilizer application implements typically include one or more ground engaging tools or openers that form a path for fertilizer deposition into the soil. The openers are used to break the soil, thereby enabling injection nozzles (e.g., positioned behind the openers) to deposit fertilizer at a desired depth beneath the soil surface. In certain embodiments, the implement may include knives (e.g., positioned behind the openers), instead of the injection nozzles, to flow the liquid fertilizer into respective trenches formed by the openers and the knives. Using such implements, fertilizer may be distributed throughout a field, either before or after planting, to facilitate enhanced crop development.

A fertilizer application implement may include a storage tank to house a flowable agricultural product for distribution throughout a field. Further, the storage tank may include a sump portion that is located vertically lower than other portions of the storage tank so that as the flowable agricultural product empties out of the storage tank, the flowable agricultural product is directed toward the sump portion. In certain applications, the fertilizer application implement may travel over a field having an upward slope and/or a downward slope. During such applications, the flowable agricultural product may be directed away from the sump portion due to gravitational force. Unfortunately, the gravitational force directing the flowable agricultural product away from the sump portion may make it difficult to pump the flowable agricultural product out of the storage tank while the fertilizer application implement is travelling over the upward slope and/or the downward slope, thereby interrupting the flow of the flowable agricultural product out of the storage tank.

BRIEF DESCRIPTION

In one embodiment, an agricultural implement includes row units configured to deliver flowable agricultural product to a field. The agricultural implement also includes a storage tank configured to hold the flowable agricultural product. The storage tank includes a first sump and a second sump. Further, the first sump is positioned adjacent to a front portion of the storage tank relative to a direction of travel and the second sump is positioned adjacent to a rear portion of the storage tank relative to the direction of travel. The agricultural implement includes a pump in fluid communication with the first sump and the second sump. The pump is configured to pump the flowable agricultural product from the storage tank to the row units.

In another embodiment, an agricultural implement includes a storage tank configured to hold flowable agricultural product. The storage tank includes a first sump and a second sump. Further, the first sump includes a first tank outlet, and the first sump is positioned adjacent to a front portion of the storage tank relative to a direction of travel. The second sump includes a second tank outlet, and the second sump is positioned adjacent to a rear portion of the storage tank relative to the direction of travel. The agricultural implement also includes a conduit coupled to the first tank outlet of the first sump and to the second tank outlet of the second sump. The agricultural implement includes a pump coupled to the conduit. The pump is configured to pump the flowable agricultural product out of the storage tank through the first and second tank outlets.

In a further embodiment, an agricultural implement includes a storage tank configured to hold flowable agricultural product. The storage tank includes a first sump and a second sump. Further, the first sump includes a first tank outlet, and the first sump is positioned adjacent to a front portion of the storage tank relative to a direction of travel. The second sump comprises a second tank outlet, and the second sump is positioned adjacent to a rear portion of the storage tank relative to the direction of travel. The agricultural implement also includes a pump in fluid communication with the first sump and the second sump. The pump is configured to pump the flowable agricultural product out of the storage tank through the first and second tank outlets.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
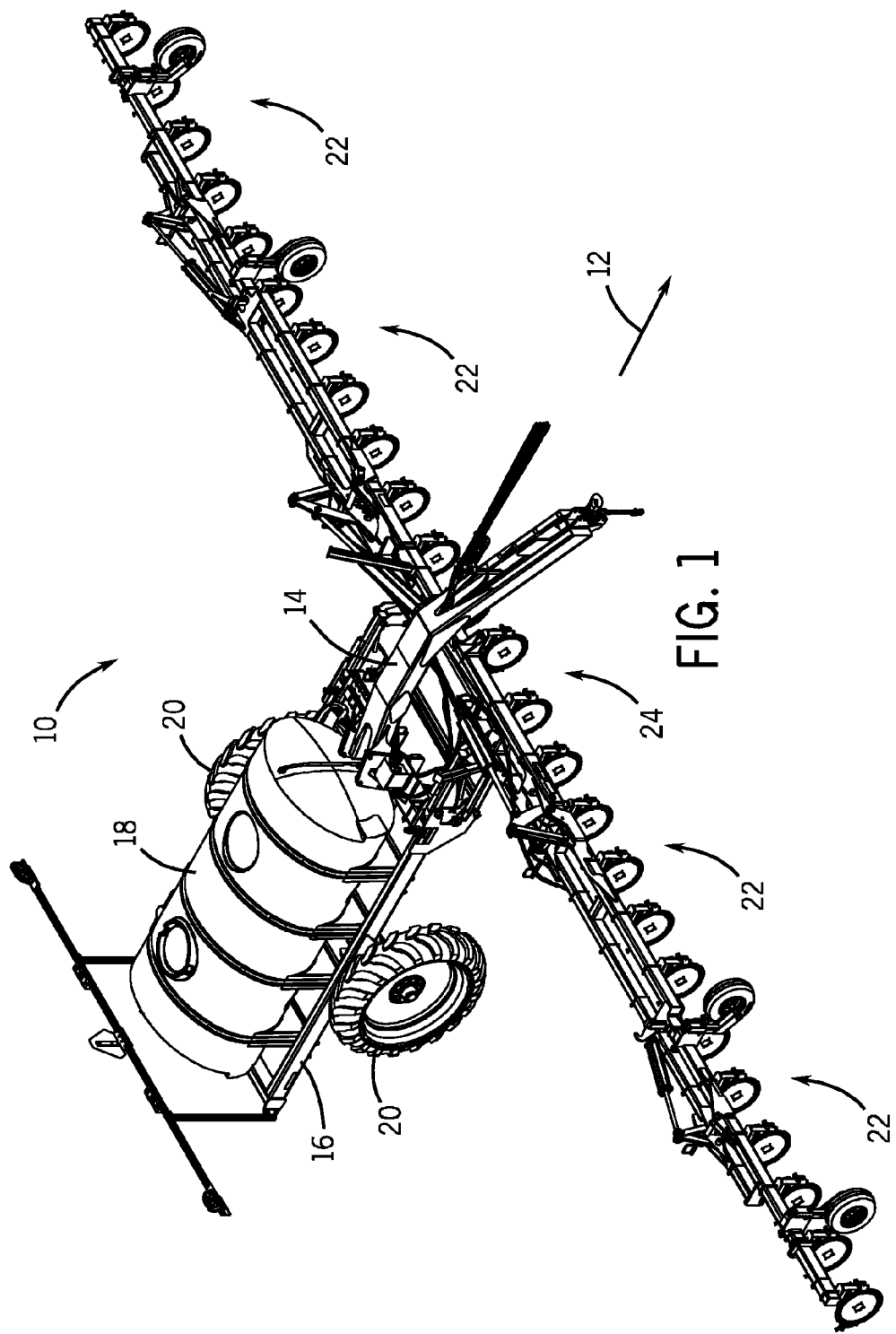
FIG. 1 is a perspective view of an embodiment of an agricultural implement including a storage tank having multiple sumps.

FIG. 1 is a perspective view of an embodiment of an agricultural implement 10 including a storage tank having multiple sumps. In the illustrated embodiment, the implement 10 is configured to be towed along a direction of travel 12 by a work vehicle, such as a tractor or other prime mover. The work vehicle may be coupled to the implement 10 by a hitch assembly 14, such as the illustrated "goose neck" pull frame. As illustrated, the hitch assembly 14 is coupled to a main frame 16 of the implement 10 to facilitate towing of the implement 10 in the direction of travel 12. In the illustrated embodiment, the main frame 16 supports a storage tank 18 configured to house a flowable agricultural product, such as liquid fertilizer. A pair of wheels 20 coupled to the main frame 16 is configured to support the weight of the frame 16, the storage tank 18, and the flowable agricultural product, thereby enabling the implement 10 to be towed across the field.

The implement 10 is configured to transfer the flowable agricultural product from the storage tank 18 to multiple row units 22 of a tool bar assembly 24. Each row unit 22 includes a ground engaging tool configured to break the soil, thereby excavating a trench into the soil. An injection nozzle or knife (e.g., positioned behind the ground engaging tool) is configured to deposit flowable agricultural product from the storage tank 18 into the trench formed by the ground engaging tool. In certain embodiments, the penetration depth of the ground engaging tools is adjustable to facilitate deposition of the agricultural product at a desired depth beneath the soil surface. Accordingly, a flowable agricultural product, such as liquid fertilizer, may be distributed throughout a field, either before or after planting, to facilitate enhanced crop development.

While the illustrated implement 10 includes 25 row units 22, it should be appreciated that alternative implements may include more or fewer row units 22. In addition, the number of row units and the spacing between row units may be particularly selected to correspond to the arrangement of row units on respective seeding or planting implements. For example, the implement 10 may include 25 row units 22 spaced 30 inches from one another. Accordingly, as the implement 10 is towed across a field, the row units 22 deposit fertilizer in rows having 30-inch spacing. After the fertilizer is applied, a seeding or planting implement (e.g., having row units spaced 30 inches from one another) may deposit seeds between the rows of fertilizer (e.g., the approximate midpoint between rows), thereby facilitating enhanced crop development. In addition, the implement 10 may be utilized to apply fertilizer to previously planted seeds (e.g., via injecting fertilizer between rows of the previously planted seeds).

The storage tank 18 may include multiple sumps to direct the flowable agricultural product out of the storage tank 18 toward the row units 22. For example, a first sump may be positioned toward the front of the storage tank 18, and a second sump may be positioned toward the rear of the storage tank 18. Accordingly, as the storage tank 18 travels over an upward slope, the flowable agricultural product may be directed by gravitational force toward the second sump at the rear of the storage tank 18. Conversely, as the storage tank 18 travels over a downward slope, the flowable agricultural product may be directed by gravitational force toward the first sump at the front of the storage tank 18. Furthermore, the first and second sumps may be fluidly coupled to a pump that pumps the flowable agricultural product out of the storage tank 18. As such, the flowable agricultural product may be pumped out of the storage tank 18 even while the storage tank 18 is traveling over an upward and/or a downward slope.

Figure 2:
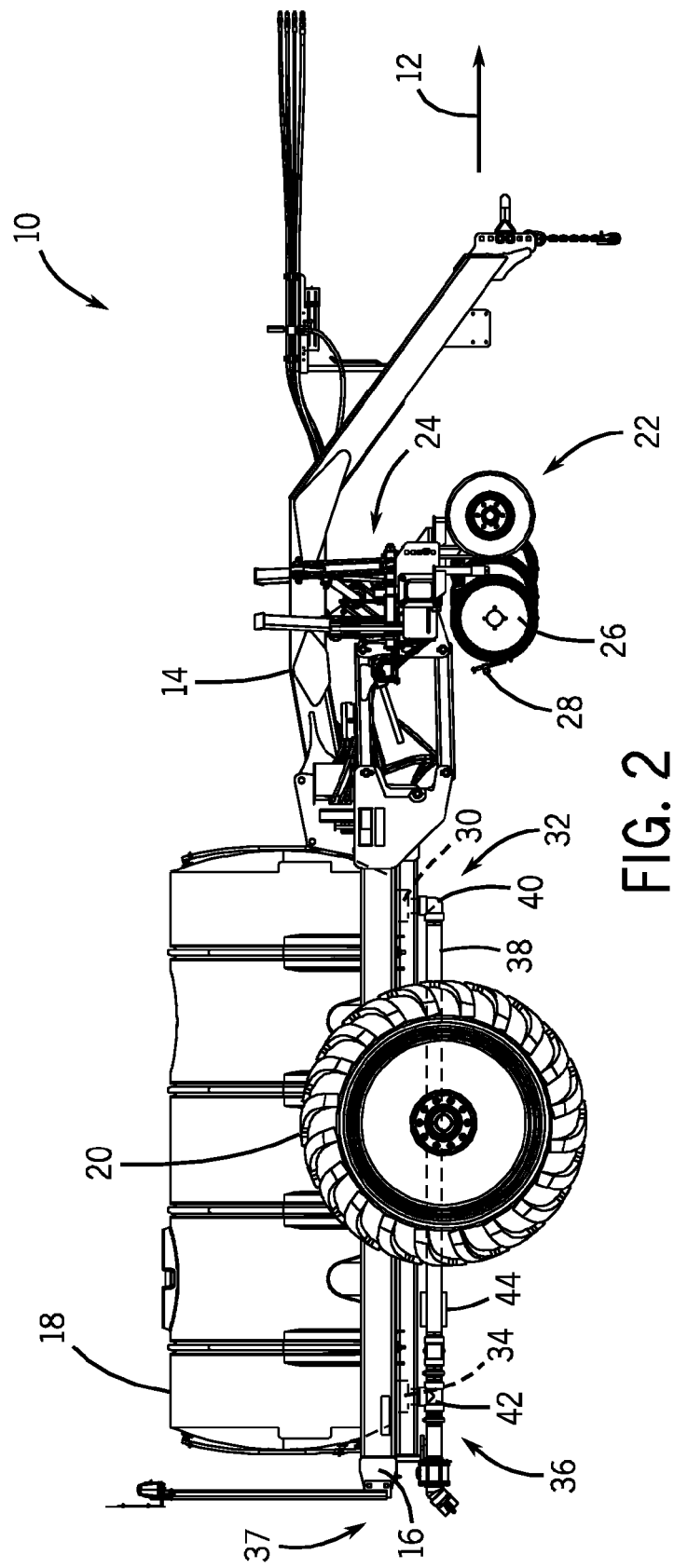
FIG. 2 is a side view of the agricultural implement of FIG. 1.

FIG. 2 is a side view of the agricultural implement 10 of FIG. 1. As discussed previously, the agricultural implement 10 includes multiple row units 22. Each of the row units 22 includes a ground engaging tool 26 configured to break the soil, thereby excavating a trench into the soil. Further, each of the row units 22 includes an injection nozzle or knife 28 positioned behind the ground engaging tool, and configured to deposit the flowable agricultural product from the storage tank 18 into the trench formed by the ground engaging tool 26. Accordingly, a flowable agricultural product may be distributed throughout a field to facilitate enhanced crop development.

The storage tank 18 includes a first sump 30 (e.g., reservoir for collecting a liquid) positioned adjacent to a front portion 32 (e.g., toward the front) of the storage tank 18 relative to the direction of travel 12. Further, the storage tank 18 includes a second sump 34 positioned adjacent to a rear portion 36 (e.g., toward the rear) of the storage tank 18 relative to the direction of travel 12. As illustrated, the first sump 30 and the second sump 34 are also positioned at a bottom portion 37 of the storage tank 18 so that gravitational force may direct the flowable agricultural product to exit the storage tank 18 by flowing toward the first sump 30 and/or the second sump 34. In the present embodiment, a conduit 38 (e.g., hose, pipe, tube, etc.) is fluidly coupled to an outlet 40 of the first sump 30, and to an outlet 42 of the second sump 34. Accordingly, the conduit 38 is used to direct the flowable agricultural product to exit the storage tank 18 via the first and second sumps 30 and 34, and to flow the product toward a pump 44 (e.g., centrifugal pump). The pump 44 is used to pump the flowable agricultural product to the row units 22.

As may be appreciated, the flowable agricultural product may be pumped by the pump 44 as long as the flowable agricultural product flows out of one of the sumps. With the first sump 30 arranged toward the front portion 32 of the storage tank 18 and the second sump 34 arranged toward the rear portion 36 of the storage tank 18, the flowable agricultural product may exit through the first sump 30 and/or the second sump 34 depending on the orientation of the storage tank 18. Accordingly, the pump 44 may consistently provide the flowable agricultural product from the storage tank 18 to the row units 22, even when moving over uneven surfaces where the orientation of the storage tank 18 changes.

Figure 3:
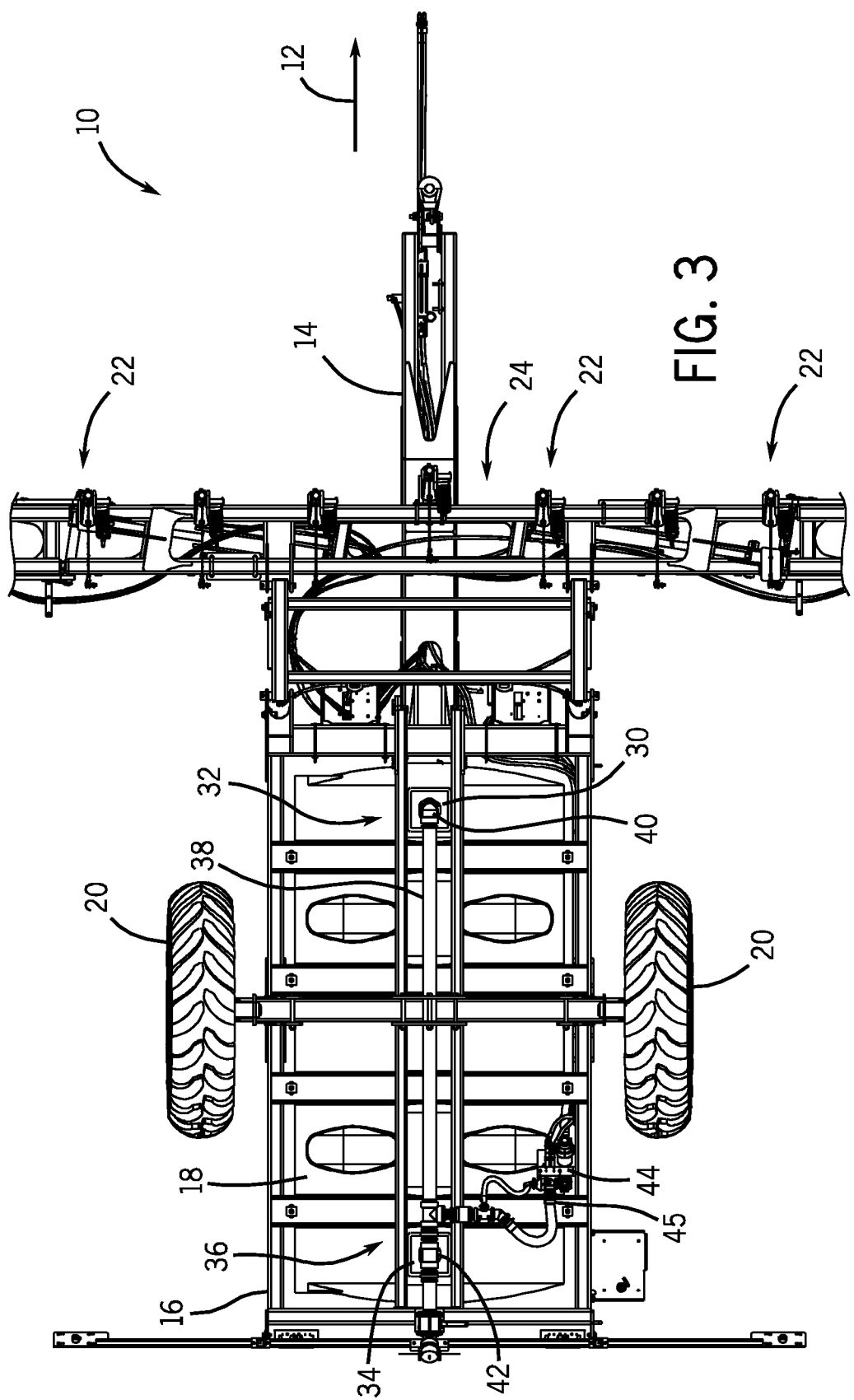
FIG. 3 is a bottom view of the agricultural implement of FIG. 1.

FIG. 3 is a bottom view of the agricultural implement 10 of FIG. 1. As illustrated, the conduit 38 fluidly couples the outlet 40 of the first sump 30 to the outlet 42 of the second sump 34. Further, the conduit 38 is fluidly coupled to an inlet 45 of the pump 44. In the present embodiment, various connecting devices are used for coupling portions of the conduit 38 together, for coupling the conduit 38 to the first sump 30, for coupling the conduit 38 to the second sump 34, and for coupling the conduit 38 to the pump 44. As may be appreciated, any suitable connecting devices may be used to couple portions of the conduit 38 together, and for coupling the conduit 38 to the first sump 30, to the second sump 34, and to the pump 44.

Figure 4:
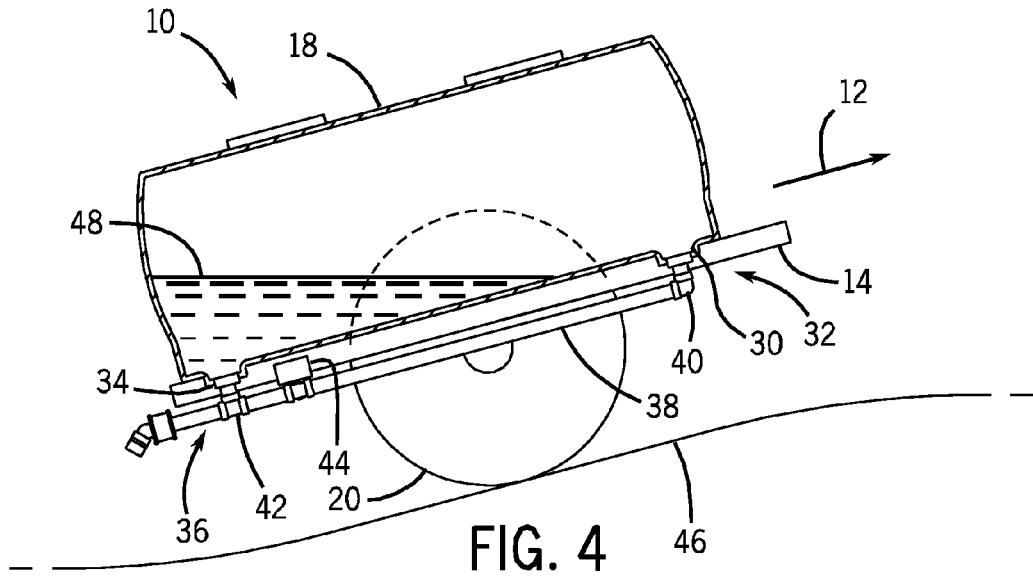
FIG. 4 is a cross-sectional side view of an embodiment of an agricultural implement having a storage tank with multiple sumps traveling over an upward slope.

FIG. 4 is a cross-sectional side view of an embodiment of the agricultural implement 10 having the storage tank 18 with the first sump 30 and the second sump 34. It should be noted that in the present embodiment the storage tank 18 is a continuous tank without internal subdivisions (e.g., there are no dividers, partitions, or walls) so that the flowable agricultural product may move unimpeded between the front portion 32 and the rear portion 36 of the storage tank 18 regardless of the amount of flowable agricultural product in the storage tank 18. The agricultural implement 10 is illustrated as traveling over an upward slope 46 relative to the direction of travel 12. As illustrated, when the agricultural implement 10 travels over the upward slope 46, gravitational force directs the flowable agricultural product in the storage tank 18 downward toward the rear portion 36 of the storage tank 18. Due to the low liquid level 48 in the storage tank 18, the flowable agricultural product only exits the storage tank 18 through the second sump 34. As may be appreciated, because the storage tank 18 includes the first sump 30 positioned at the front portion 32 of the storage tank 18 and the second sump 34 positioned at the rear portion 36 of the storage tank 18, the flowable agricultural product is provided to the row units 22 while the agricultural implement 10 travels over the upward slope 46 regardless of the liquid level 48 of the flowable agricultural product in the storage tank 18. Accordingly, in the present embodiment, the flowable agricultural product flows out of the outlet 42 of the second sump 34, through the conduit 38, through the pump 44, and toward the row units 22 of the agricultural implement 10.

Figure 5:
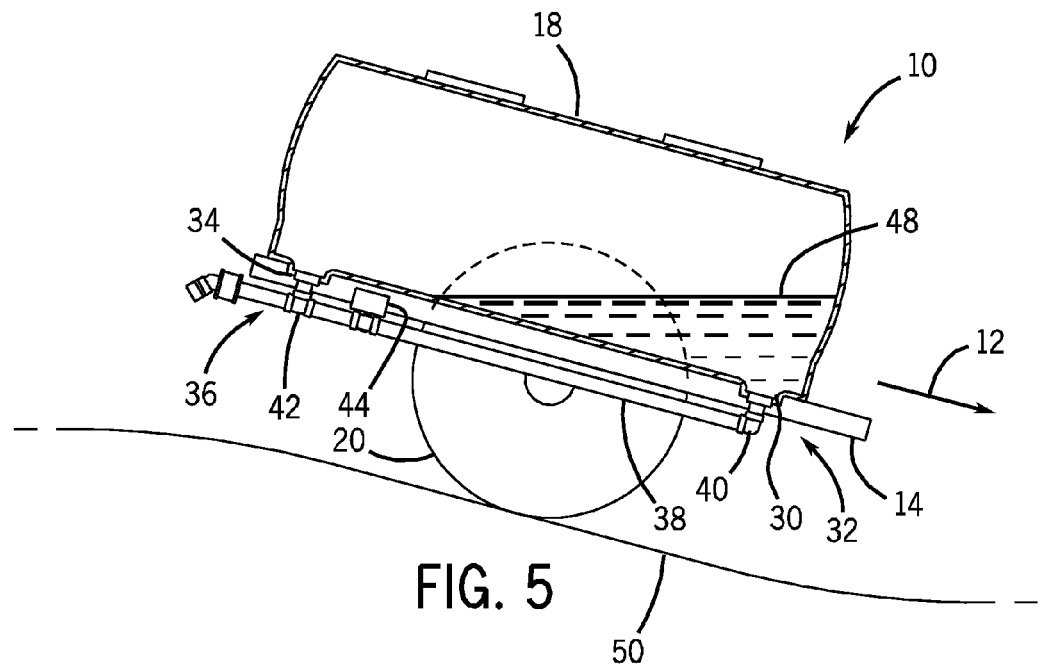
FIG. 5 is the cross-sectional side view of the agricultural implement of FIG. 4 traveling over a downward slope.

FIG. 5 is a cross-sectional side view of the agricultural implement 10 of FIG. 4. The agricultural implement 10 is illustrated as traveling over a downward slope 50 relative to the direction of travel 12. As illustrated, when the agricultural implement 10 travels over the downward slope 50, gravitational force directs the flowable agricultural product in the storage tank 18 downward toward the front portion 32 of the storage tank 18. Due to the low liquid level 48 in the storage tank 18, the flowable agricultural product only exits the storage tank 18 through the first sump 30. As may be appreciated, because the storage tank 18 includes the second sump 34 positioned at the rear portion 36 of the storage tank 18 and the first sump 30 positioned at the front portion 32 of the storage tank 18, the flowable agricultural product is provided to the row units 22 while the agricultural implement travels over the downward slope 50 regardless of the liquid level 48 of the flowable agricultural product in the storage tank 18. Accordingly, in the present embodiment, the flowable agricultural product flows out of the outlet 40 of the first sump 30, through the conduit 38, through the pump 44, and toward the row units 22 of the agricultural implement 10. Therefore, by having the first sump 30 and the second sump 34 the flowable agricultural product may be provided to the row units 22 while the agricultural implement 10 travels over the upward slope 46 and the downward slope 50, even if the liquid level 48 of the flowable agricultural product is low.

While only certain features of the invention have been illustrated and described herein, many modifications and changes will occur to those skilled in the art. It is, therefore, to be understood that the appended claims are intended to cover all such modifications and changes as fall within the true spirit of the invention.

We claim:

1. An agricultural implement, comprising:
a storage tank configured to hold a flowable liquid agricultural product, the storage tank comprising a first sump and a second sump, wherein the first sump comprises a first tank outlet, the first sump is positioned adjacent to a front portion of the storage tank relative to a direction of travel, the second sump comprises a second tank outlet, and the second sump is positioned adjacent to a rear portion of the storage tank relative to the direction of travel;
a conduit fluidly coupled to the first tank outlet of the first sump and to the second tank outlet of the second sump; and
a pump coupled to the conduit, wherein the pump is configured to pump the flowable liquid agricultural product out of the storage tank through the first and second tank outlets.

2. The agricultural implement of claim 1, wherein the flowable liquid agricultural product comprises anhydrous ammonia.

3. The agricultural implement of claim 1, wherein the first sump is positioned to facilitate pumping of the flowable liquid agricultural product while the storage tank is angled downwardly, and the second sump is positioned to facilitate pumping of the flowable liquid agricultural product while the storage tank is angled upwardly.

4. The agricultural implement of claim 1, wherein the pump comprises a centrifugal pump.

5. The agricultural implement of claim 1, wherein the first sump is positioned adjacent to a bottom portion of the storage tank.

6. The agricultural implement of claim 1, wherein the second sump is positioned adjacent to a bottom portion of the storage tank.

7. An agricultural implement, comprising:
a storage tank configured to hold flowable liquid agricultural product, the storage tank comprising a first sump and a second sump, wherein the first sump comprises a first tank outlet, the first sump is positioned adjacent to a front portion of the storage tank relative to a direction of travel, the second sump comprises a second tank outlet, and the second sump is positioned adjacent to a rear portion of the storage tank relative to the direction of travel; and
a pump in fluid communication with the first sump and the second sump, wherein the pump is configured to pump the flowable liquid agricultural product out of the storage tank through the first and second tank outlets.

8. The agricultural implement of claim 7, wherein the flowable liquid agricultural product comprises a fertilizer.

9. The agricultural implement of claim 7, wherein the flowable liquid agricultural product comprises a liquid fertilizer.

10. The agricultural implement of claim 7, wherein the first sump is positioned to facilitate pumping of the flowable liquid agricultural product while the storage tank is angled downwardly, and the second sump is positioned to facilitate pumping of the flowable liquid agricultural product while the storage tank is angled upwardly.

11. The agricultural implement of claim 7, wherein the first sump and the second sump are in fluid communication with a single compartment of the storage tank.

12. The agricultural implement of claim 7, wherein the first sump is position adjacent to a bottom portion of the storage tank, the second sump is positioned adjacent to the bottom portion of the storage tank, or a combination thereof.

13. The agricultural implement of claim 7, comprising a conduit extending along the direction of travel, wherein the conduit is fluidly coupled to the first tank outlet of the first sump, to the second tank outlet of the second sump, and to the pump.

14. A product storage assembly for an agricultural implement, comprising:
a storage tank configured to hold a flowable liquid agricultural product, the storage tank comprising a first sump and a second sump, wherein the first sump comprises a first fluid collection reservoir positioned adjacent to a front portion of the storage tank relative to a direction of travel and a first outlet configured to receive the flowable liquid agricultural product from the first fluid collection reservoir, and the second sump comprises a second fluid collection reservoir, separate from the first fluid collection reservoir, positioned adjacent to a rear portion of the storage tank relative to the direction of travel and a second outlet, separate from the first outlet, configured to receive the flowable liquid agricultural product from the second fluid collection reservoir; and
a pump in fluid communication with the first sump and the second sump, wherein the pump is configured to pump the flowable liquid agricultural product out of the storage tank through the first and second outlets.

15. The product storage assembly of claim 14, comprising a conduit fluidly coupled to the first outlet adjacent to the front portion of the storage tank, to the second outlet adjacent to the rear portion of the storage tank, and to the pump, wherein the conduit is configured to provide the flowable liquid agricultural product from the first and second sumps to the pump.

16. The product storage assembly of claim 15, wherein the conduit extends along the direction of travel.

17. The product storage assembly of claim 14, wherein the first sump is positioned to facilitate pumping of the flowable agricultural product while the storage tank is angled downwardly, and the second sump is positioned to facilitate pumping of the flowable liquid agricultural product while the storage tank is angled upwardly.

18. The product storage assembly of claim 14, wherein the first sump is positioned adjacent to a bottom portion of the storage tank.

19. The product storage assembly of claim 14, wherein the second sump is positioned adjacent to a bottom portion of the storage tank.

20. The product storage assembly of claim 14, wherein the flowable liquid agricultural product comprises a fertilizer.

* * * * *